(12) United States Patent
Shantharaj et al.

(10) Patent No.: US 12,277,093 B2
(45) Date of Patent: Apr. 15, 2025

(54) METHOD FOR MANAGING A PLURALITY OF ACCOUNTS IN A MULTI-ACCOUNT DATABASE SYSTEM

(71) Applicants: Sandeep Shantharaj, Herndon, VA (US); Sunitha Kempnool Shambulingappa, Herndon, VA (US)

(72) Inventors: Sandeep Shantharaj, Herndon, VA (US); Sunitha Kempnool Shambulingappa, Herndon, VA (US)

( * ) Notice: Subject to any disclaimer, the term of this patent is extended or adjusted under 35 U.S.C. 154(b) by 0 days.

(21) Appl. No.: 18/169,551

(22) Filed: Feb. 15, 2023

(65) Prior Publication Data
US 2023/0259497 A1 Aug. 17, 2023

Related U.S. Application Data

(60) Provisional application No. 63/310,587, filed on Feb. 16, 2022.

(51) Int. Cl.
*G06F 17/00* (2019.01)
*G06F 7/00* (2006.01)
*G06F 16/185* (2019.01)

(52) U.S. Cl.
CPC .................. *G06F 16/185* (2019.01)

(58) Field of Classification Search
CPC .................................................... G06F 16/185
USPC ......................................................... 707/687
See application file for complete search history.

(56) References Cited

U.S. PATENT DOCUMENTS

| | | | |
|---|---|---|---|
| 8,447,829 B1* | 5/2013 | Geller | H04L 9/3239 709/217 |
| 10,949,402 B1* | 3/2021 | Chu | G06F 16/275 |
| 11,057,491 B1* | 7/2021 | Bijon | H04L 63/105 |
| 2002/0198806 A1* | 12/2002 | Blagg | G06Q 40/00 705/35 |
| 2006/0233313 A1* | 10/2006 | Adams | H04Q 3/0062 379/21 |
| 2016/0019241 A1* | 1/2016 | Prabaker | H04L 67/55 707/783 |
| 2019/0364051 A1* | 11/2019 | Ferrans | G06F 16/9024 |
| 2020/0120098 A1* | 4/2020 | Berg | H04L 63/104 |
| 2022/0021746 A1* | 1/2022 | Bijon | G06F 21/604 |
| 2022/0368593 A1* | 11/2022 | Shankar | H04L 41/0893 |
| 2023/0169090 A1* | 6/2023 | Gernhardt | G06F 11/2048 707/610 |

* cited by examiner

*Primary Examiner* — Pavan Mamillapalli

(57) ABSTRACT

A system for cloud-based data-as-a-service setup and configuration across multiple accounts, multiple regions, and multiple cloud providers, wherein the system uses higher level constructs along with simplified integration of the data-as-a-service accounts with other software products and related analytics. Account group or similar grouping constructs allow for configuring multiple data-as-a-service accounts at once with repetitive and duplicate configuration for each account with the ability to allow for overrides to allow for extensibility or for exception purposes. Logical constructs called namespace allow for grouping resources to create logical boundaries within a shared data-as-a-service account. Namespace provides stored procedures as necessary controls to implement policies as code to keep the namespace behavior consistent. A user interface widget enables specification of privileges that users of a shared data-as-a-service account are allowed to grant and revoke.

12 Claims, 3 Drawing Sheets

METHOD FOR MANAGING A PLURALITY OF ACCOUNTS IN A MULTI-ACCOUNT DATABASE SYSTEM

CROSS-REFERENCE TO RELATED APPLICATION

This application claims the benefit of priority of U.S. provisional application No. 63/310,587, filed Feb. 16, 2022, the contents of which are herein incorporated by reference.

BACKGROUND OF THE INVENTION

The present invention relates to databases and, more particularly, a method of managing a plurality of accounts in a multi-account database system.

Cloud-based multi-account database systems, sometimes referred to as data platforms, are data-as-a-service, are currently some of the fastest growing platforms; for instance, Snowflake™. Such cloud-based multi-account database systems enable customers to create one or more accounts to store data, query data, share data, etc., wherein each account identifies a specific cloud provider and region. Hence, customers of such multi-account database systems typically create multiple accounts either for disaster recovery purposes or to maintain separate environments for development/production purposes or for legal reasons or other internal reasons.

From an administration or account management perspective, customers must either manually configure account-level resources such as roles, databases, warehouses, etc., when multiple teams/applications share a given account or develop custom solutions or obtain services from the multi-account database system's professional services or consulting companies, which can be rather expensive and time consuming.

In other words, a multi-account database system's account setup, configuration, management, and integration must be done at a per-account level. Hence managing multiple systemic accounts can be a challenge and involves repetitive duplicate work.

Therefore, a need exists to simplify multi-account database systems' account setup, access control and data sharing functionality, especially when customers manage multiple accounts. Specifically, creating logical boundaries around team/application (person/program) specific resources so that teams/applications can share the same account safely and securely.

SUMMARY OF THE INVENTION

The present invention creates a concept of an account group corresponding to a plurality of accounts within a multi-account database system. Conceptually, the account group is the parent, and the plurality of accounts are the children. At the access group level, through a control plane, a setup/configuration of objects such as tags, parameters, privileges, network policies, etc., can be defined. This configuration of objects is inherited by the children. At the account-child level, a user can augment or override a specific object configuration to minimize effort required to manage multiple accounts. In the example of Snowflake™, such account management of multiple cloud providers and regions would tend to accelerate customers to adopt the Snowflake™ platform quickly.

The present invention provides a method of managing a plurality of accounts in a multi-account database system, wherein the method embodies a simplified cloud-based service setup and configuration across multiple accounts of a database system that resides in multiple regions and multiple cloud providers. The service setup and configuration use higher level constructs for data-sharing in and access control of the plurality accounts.

The present invention also embodies a user-interface which simplifies integration with other software products and related reporting/analytics for better visibility.

This invention also creates a concept of a namespace to create logical boundaries around application resources and enforces governance rules/policies as code.

This invention embodies a process of specifying privileges that applications should be allowed to grant or revoke via stored procedures with a simplified user interface (UI) widget.

In one aspect of the present invention, a system for managing a nonnative multiple account database (NMCD), the nonnative system includes the following: a memory; and a processor coupled with the memory, wherein the system includes a parent platform having a producer account on the NMCD, wherein the producer account is operatively associated with a plurality of child accounts on the NMCD; and a high-level parent-child construct configured, by way of the processor, to enable an inheritance deployment of one or more resource configurations defined on the parent platform to the plurality of child accounts by way of the producer account.

In one aspect of the present invention, the above system further includes wherein each resource configuration comprises one or more object configuration, wherein each object configuration, by way of the NMCD, configures an object on each heir child account, wherein the parent platform prioritizes, by way of the processor, an object configuration enabled on the heir child account over the object configuration comprised by the resource configuration, whereby the inheritance deployment is augmented for each respective child account, wherein the parent platform provides, by way of the processor, a control plane for setting privileges for each object.

In yet another embodiment of the present invention, a system for managing access to a shared pool of configurable resources on a multiple account database, wherein the system includes: a memory; and a processor coupled with the memory, wherein the system provides high-level namespace construct facilitating access between the shared pool and a plurality of users, wherein the high-level namespace construct owns a one or more objects in the shared pool of configurable resources so that each user manages the objects only through a stored procedure obtaining a set of application programming interface calls for configuring each object, wherein a user is an individual or application, wherein each object can be a role, a database, a warehouse, etc.

In still yet another aspect of the present invention, a method of configuring a plurality of privileges for each object of the resource configuration of the above-mentioned system, the method includes providing a user interface widget, by way of the processor, through the control plane, wherein the user interface widget enables changing each privilege from default allow/deny to explicit allow to explicit deny and back, wherein the user interface widget provides a clickable interface for changing each privilege, wherein the configured privileges are used by a stored procedure when users execute SQL commands indirectly via the stored procedure.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides an account management architecture for configuring objects across a plurality of accounts of a multi-account database. Such an account management architecture simplifies data sharing and access control for multi-account database systems residing across multiple regions/multiple cloud providers, like Snowflake™. The present invention uses higher level constructs via a sharer account residing in the multi-account database system, wherein the sharer account shares data and provides access control to a plurality of target accounts also on the multi-account database system (though different target accounts may reside in different regions and otherwise could not share with other, related target accounts). The present invention also provides simplified integration of accounts with other software products and related reporting/analytics for better visibility.

Figure 1:
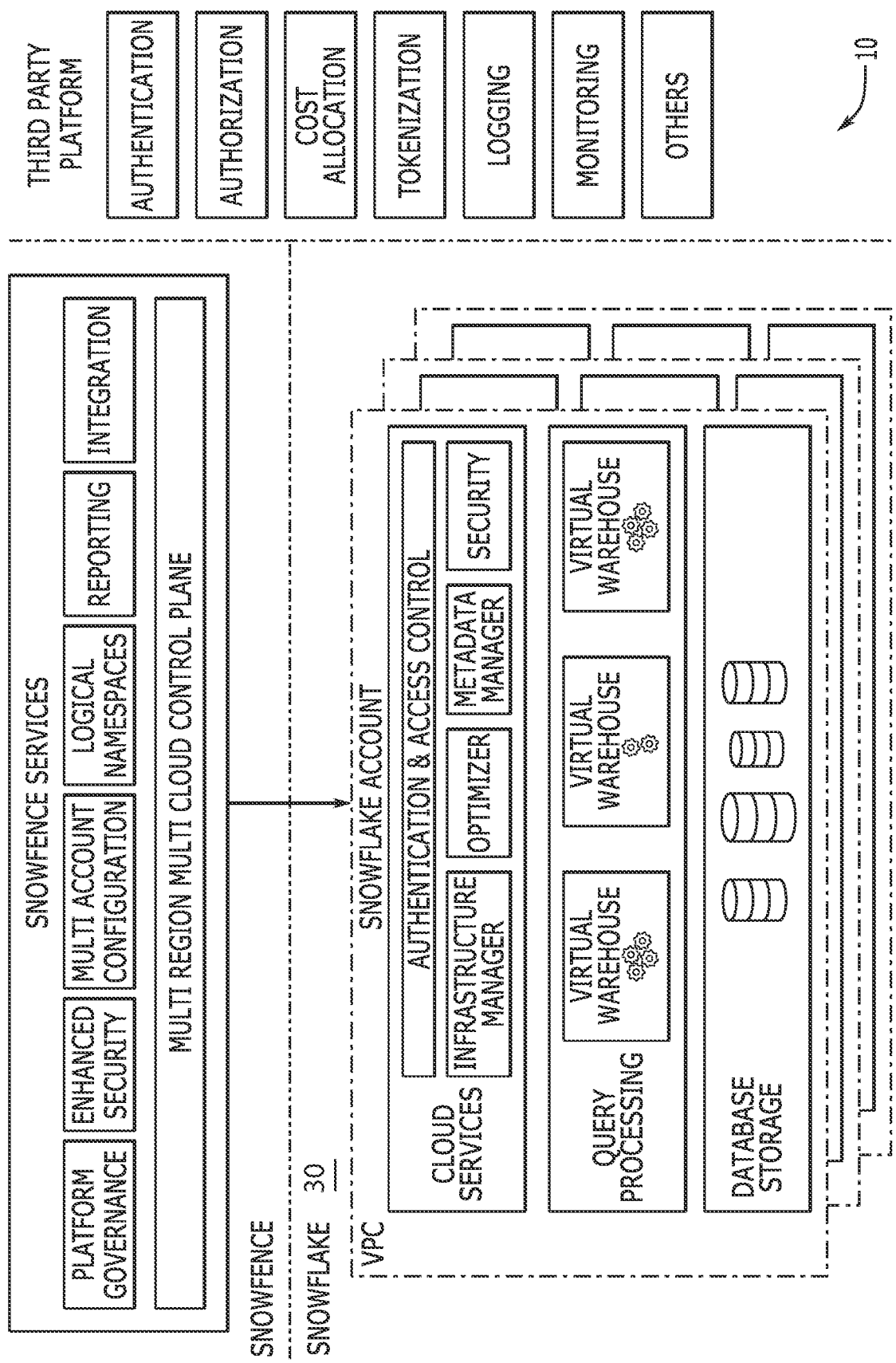
FIG. 1 is a diagrammatical view of an exemplary embodiment of the present invention.
Figure 2A:
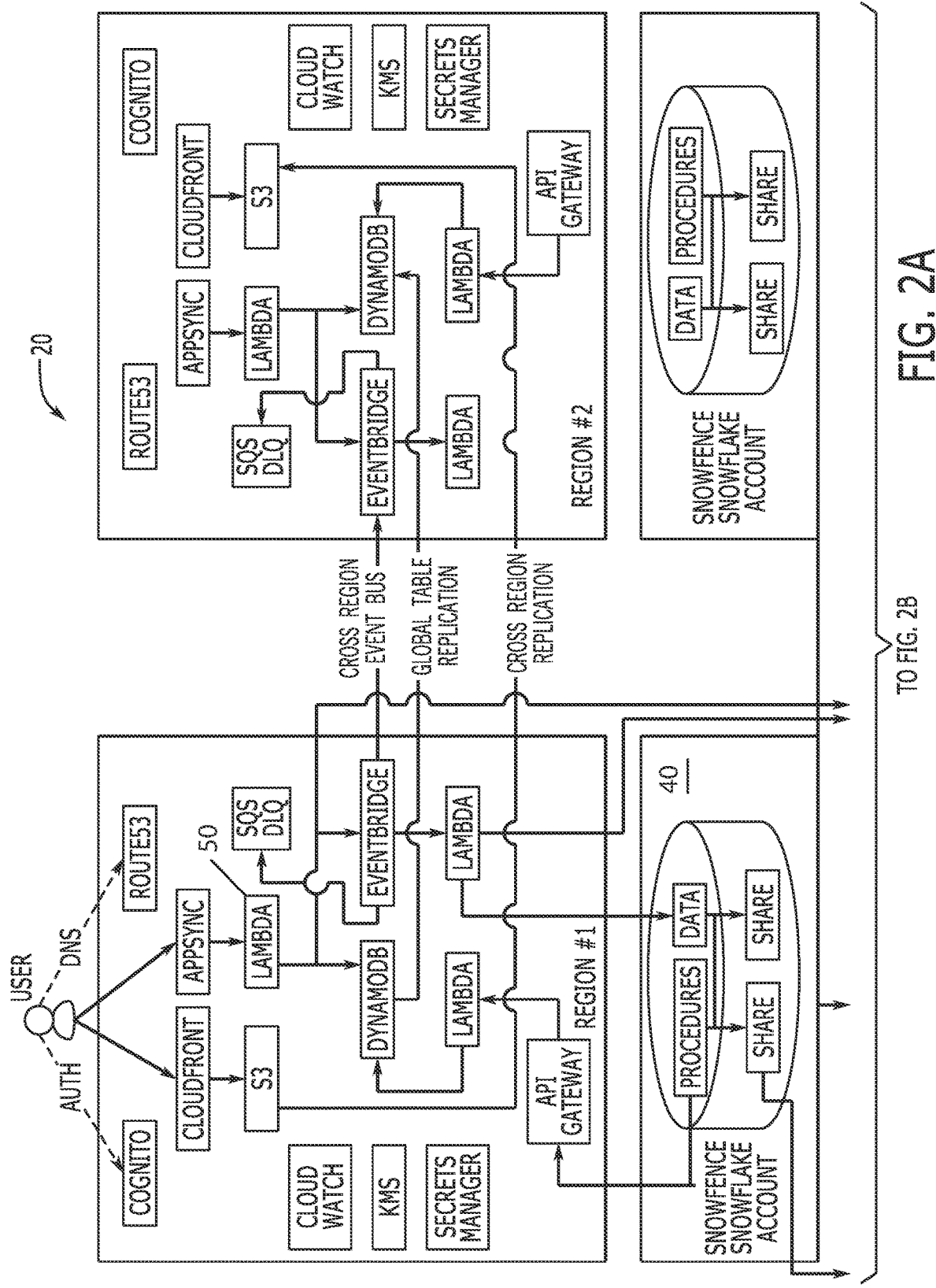
FIG. 2A is a flow chart of an exemplary embodiment of the present invention.
Figure 2B:
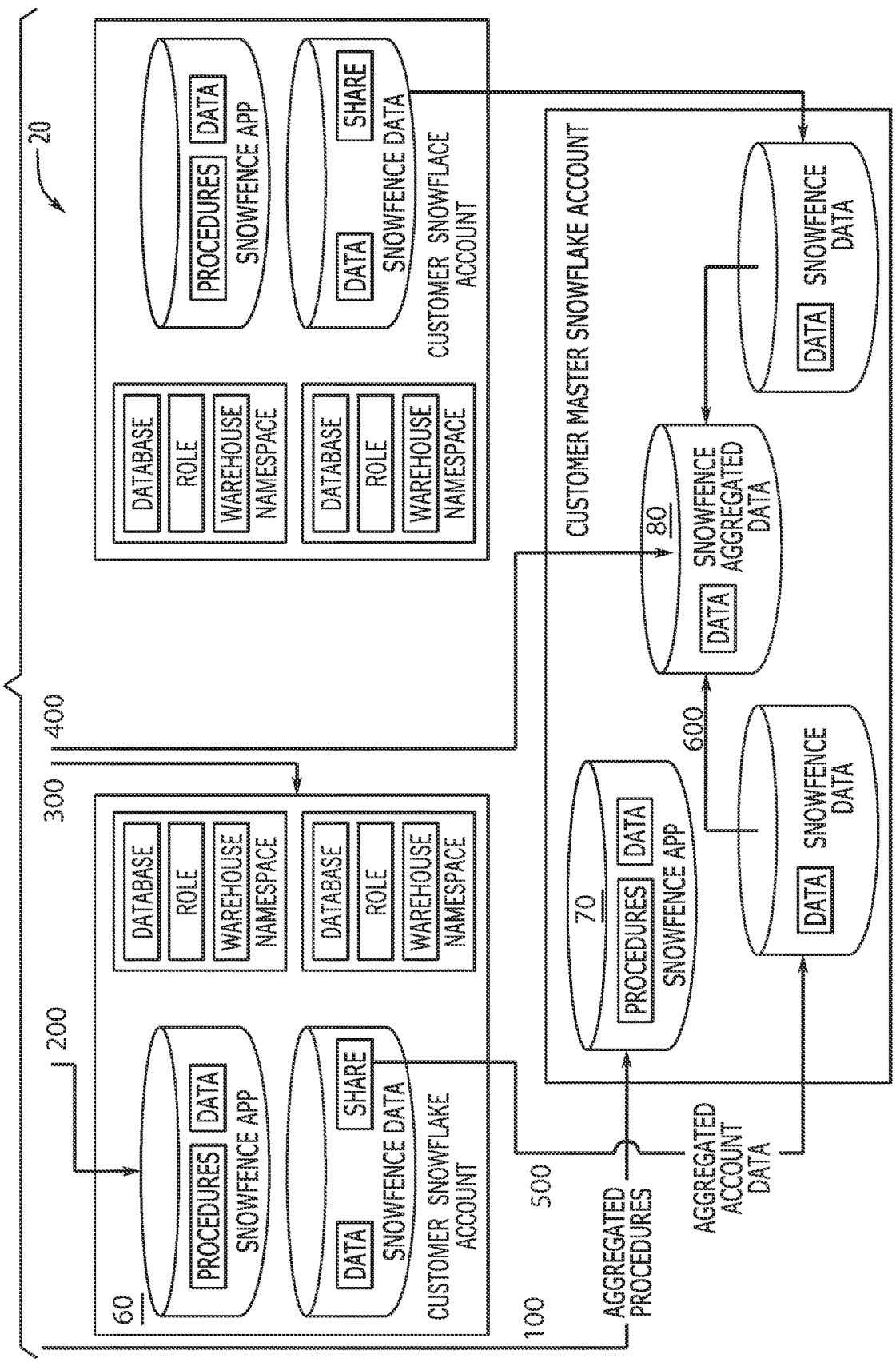
FIG. 2B is a continuation of FIG. 2A.

Referring now to FIGS. 1 through 2B, the present invention may include a systemic platform for managing and providing custom solutions for a plurality of target accounts residing in a multi-cloud-based, multi-account database system data-as-a-service provider. The systemic platform provides a parent-child construct, via high-level object-oriented specification language or the like, facilitating inheritance of one or more configuration specification from the parent platform to the plurality of cloud-based services.

In the example of Snowflake™, each account identifies a specific cloud provider and region. In a typical enterprise, multiple Snowflake™ accounts will need to be set up and configured to allow for disaster recovery, development/production environments, multi-cloud strategy, legal reasons, and other company specific reasons. Most of the configurations are the same across multiple Snowflake™ accounts. However, Snowflake™ does not support configuring multiple accounts at once. This leads to a lot of repetitive and duplicate work for Snowflake™ customers. The first part of the invention provides a solution for the above-mentioned problem by providing a management platform (colloquially known as Snowfence™) that provides a higher-level construct called Account Group, where the Account Group is a sharer/parent account adapted to group a plurality of target accounts as its children so that each configuration specification defined once at the Account-Group level is applied to (inherited by) individual children/target accounts by way of the platform. The same concept applies to integration of accounts with vendor products as well.

The above eliminates the repetitive, duplicate work of configuring multiple accounts one at a time. The present invention contemplates that minor differences between the accounts may be beneficial in some cases. To allow for such exceptions, the platform allows configuration to be overridden or augmented at the child/target account level. This way, most of the configuration will be inherited from the account group and some configuration items at the account level may either augment account group level configuration or override account group level configuration. Resource types (such tags, parameters, privileges, network policies) can be configured using the above-described approach.

The platform goes one step further where certain configuration items may be required or optional, mutable or immutable (when inherited from system level to account group level to account level), enabled or disabled and provide default values as well.

Some of the types of objects that can be configured via the above-mentioned platform are tags, parameters, privileges, network policies and resources. There are other objects that can be configured with the same approach as above as the present invention contemplates one or more methodologies to simplify multi-account configuration (beyond just type of object configurations).

To allow for applying configuration changes, the platform allows prioritized deployment from lower environments to higher environments, account by account, etc., but also provides users the ability to apply changes immediately and immutable (augmentation) so that future configuration specification for that specific augmented object, is applied. To make it easy to distinguish which accounts have received the changes, the system shows account group and account level summary.

From a communication perspective, the present invention provides a cloud-based control plane (e.g., that resides on cloud computing platform, omni-cloud, such as but not limited to AWS™) as depicted in FIG. 2A. For the account configuration, users of the systemic platform can configure objects such as tags, parameters, privileges, network policies, etc. at the account group level or account level and the changes will be stored just in the control plane (e.g., in the omni-cloud) in most cases unless auto-sync is the default mode for certain configurations. When the customer initiates the sync process, the systemic control plane sends an event per consumer to each target/child account to the appropriate cloud region (still within the systemic control plane—e.g., on an omni-cloud account) so that configuration changes can be published to the present invention's sharer account (known as producer account) locally within the cloud region (or to the nearest AWS™ region where one of the target account exists in case of Azure and GCP). Configuration data along with Custom Code in the form of multi-account database system's Functions and Stored Procedures are then shared from the systemic platform's producer account to consumer target accounts via the multi-account database system's native apps functionality as depicted in FIG. 2B. The present invention uses both direct calls to consumer target accounts via JDBC and through native apps to configure consumer target accounts.

Referring to the Pathways of FIG. 2B:

Path 100: since the systemic platform reporting can aggregate data across the plurality of target/children customer accounts (via the account group level), consumer is expected to provide an account where data from consumer local accounts will be brought in and then aggregated. To support this use case, the present invention creates two types of logical procedures in the systemic platform's producer/sharer account. One of them is meant to be executed in consumer's local accounts and the other in the consumer's aggregate account.

Path 200: shows that part of the application hosted in systemic platform producer account will be shared with consumer/target/children accounts via the multi-account database system's native app sharing capability. These native applications allows for secure data sharing by allowing producers to create local state objects (e.g., tables) and local compute objects (e.g. stored procedures, external functions, tasks) and share objects (local state and compute objects) representing the application logic to the consumer accounts.

Path 300: shows that even though configuration data is stored on the omni-cloud and copied to systemic platform's producer account when synchronized and shared to consumer accounts via the native app, the configuration does not automatically get applied in the consumer accounts. The lambda function 50 on the omni-cloud connects to the producer account as depicted by path 300 and performs the necessary configuration. The configuration data shared to the consumer accounts via native app is used to enforce namespace boundary and for reporting needs.

Path 400: When a user of the present invention wants to view reports at the account group level or account level or namespace level, the systemic platform 10 backend 20 and lambda function 50 in this case, connects to consumer's aggregate target account and retrieves the data to display on the UI.

Path 500: Consumer local target accounts will need to share account level data to consumer aggregate target account 70 so that the systemic platform 10 can generate reporting data at the account group level and perhaps even across all account groups. This is achieved using native (to the multi-account database system) data sharing capability, which is what path 500 depicts.

Path 600: shows when consumer local/target accounts are shared with consumer aggregate account 70, the data gets aggregated and is then stored in aggregate database 80, which is what path 600 depicts.

A second functionality separately enables multiple teams/applications to share target accounts 60. Currently, target customers 60 must establish and maintain separation of resources such as roles, databases, warehouses, integrations, etc., either manually or via custom processes. This can be very time-consuming, error prone and expensive. This invention introduces the concept of a namespace (logical construct) built on top of constructs provided by multi-account database system 30.

The main challenge here is that application teams should have minimal privileges so that they cannot freely create objects or access objects that they don't have privileges to or share data that they are not authorized for. Rather than enforcing policies manually or via custom processes, the platform simplifies it by doing the following:

All resources for a given team/application are grouped under the concept of a namespace. Namespace is enforced either via naming conventions or via tags or both.

Applications teams do not have access to directly create account level resources such as users, roles, databases, warehouses, integrations, resource monitors, etc.

Applications teams cannot own the above-mentioned account-level resources either. Instead, these account-level objects for a given team/application are owned by namespace specific roles that only the platform roles have access to. This way, teams/applications cannot modify these account-level resources directly.

To allow teams/applications to create and manage their own resources even though they do not own account-level resources, the platform provides a stored procedure that teams/applications can call and pass the command to execute. The platform enforces all the policies via the stored procedure(s) or by calling out to one or more external API(s) from the stored procedure and the given command(s) is executed only after the command satisfies the policies fully. The stored procedures use the configuration data that was published and shared via the sync process described as part of the account group functionality. Doing it this way removes the need to configure objects manually.

In addition to the above, to allow for additional configurable restrictions as to which namespaces are allowed to share data between each other or to restrict warehouse usage only within a namespace for billing purposes, the platform restricts creating standard schema by default and requires managed schemas. This ensures that teams/applications cannot execute grant or revoke commands directly. Instead, they would have to call the stored procedure(s) mentioned above, which gives the platform the necessary control to enforce policies as code.

To improve security, the roles that own namespace specific account-level objects do not have access to actual data stored in databases since schema level objects are owned by a separate set of namespace specific roles that only teams/applications have access to. These separate sets of namespace specific roles do not chain up to platform or snowflake admin roles.

The above-mentioned stored procedure(s) also provides for a configurable set of privileges that teams/applications are allowed to grant or revoke.

To provide teams/applications access to their namespace, there will be a minimum number of resources that must be created during namespace creation. Rather than create a rigid list of resources, the platform allows users to create a configurable list of prioritized commands with necessary placeholders for namespace prefixes and other such runtime defined inputs in a hierarchical way as mentioned above (system defined to account group level to account level).

The third part of the invention is more about how the UI widget allows configuring specific privileges for each resource type to be allowed or denied with ease by either clicking on the privilege to change from default allow/deny to explicit allow to explicit deny and back or by right clicking and selecting explicit allow or deny. These configured privileges are used by the stored procedure(s) mentioned above when teams/applications try to execute SQL commands indirectly via the stored procedure(s).

Additionally, the platform provides reporting and analytics capabilities at the account group level, account level and namespace level to improve visibility into the customer's target account 60 usage.

It should be understood that even though the disclosure refers primarily and repeatedly to Snowflake™, the present invention is applicable to all cloud-based data storage and analytics services, generally termed "data-as-a-service". Where a data-as-a-service allows corporate users to store and analyze data using cloud-based hardware and software, across a plurality of accounts, the present invention is applicable.

Snowflake™ stored procedures can be executed either with caller's rights or owner's rights. Snowflake™ native applications allow service providers like the present invention to create stored procedures with their business logic and share it with users/customers of the present invention/systemic platform 10 in a secure way without exposing code to users/customers. However, multi-account database systems 30 restricts that the native application procedures can only be executed with owner's rights. The drawback with executing with owner's rights is that the stored procedure does not know who the caller is without allowing the caller to explicitly pass caller information as arguments to procedure. This is not a secure way of doing things.

The architecture of the present invention uses a remote proprietary database and shared with users/customers and a local database owned by the customer. As part of setup script for users of the present invention, customer's administration will create a stored procedure with caller's rights to collect caller's context such as role, database, warehouse, etc., and encrypt them using a secure encryption key and then creates a function for present invention/systemic platform to decrypt the caller's context without exposing the encryption key even to the systemic platform. The encrypted context along with the command is then passed to the stored procedure for processing. If the systemic platform can successfully decrypt the request, then the platform is assured that the caller did not spoof the request since only the customer's administrator has access to encryption key and no one else. As a result, the present invention can allow customer's application teams to call stored procedure to perform their operations and not be able to bypass security gates by spoofing.

In certain embodiments, the network may refer to any interconnecting system capable of transmitting audio, video, signals, data, messages, or any combination of the preceding. The network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

The server and the computer of the present invention may each include computing systems. This disclosure contemplates any suitable number of computing systems. This disclosure contemplates the computing system taking any suitable physical form. As example and not by way of limitation, the computing system may be a virtual machine (VM), an embedded computing system, a system-on-chip (SOC), a single-board computing system (SBC) (e.g., a computer-on-module (COM) or system-on-module (SOM)), a desktop computing system, a laptop or notebook computing system, a smart phone, an interactive kiosk, a mainframe, a mesh of computing systems, a server, an application server, or a combination of two or more of these. Where appropriate, the computing systems may include one or more computing systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

In some embodiments, the computing systems may execute any suitable operating system such as IBM's zSeries/Operating System (z/OS), MS-DOS, PC-DOS, Mac-OS, Windows, Unix, OpenVMS, an operating system based on Linux, or any other appropriate operating system, including future operating systems. In some embodiments, the computing systems may be a web server running web server applications such as Apache, Microsoft's Internet Information Server™, and the like.

In particular embodiments, the computing systems include a processor, a memory, a user interface and a communication interface. In particular embodiments, the processor includes hardware for executing instructions, such as those making up a computer program. The memory includes main memory for storing instructions such as computer program(s) for the processor to execute, or data for processor to operate on. The memory may include mass storage for data and instructions such as the computer program. As an example and not by way of limitation, the memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface may include hardware, software, or both providing one or more interfaces for communication between a person and the computer systems. As an example, and not by way of limitation, a user interface device may include a keyboard, keypad, microphone, monitor, mouse, printer, scanner, speaker, still camera, stylus, tablet, touchscreen, trackball, video camera, another suitable user interface or a combination of two or more of these. A user interface may include one or more sensors. This disclosure contemplates any suitable user interface.

The communication interface includes hardware, software, or both providing one or more interfaces for communication (e.g., packet-based communication) between the computing systems over the network. As an example, and not by way of limitation, the communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example, and not by way of limitation, the computing systems may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing systems may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing systems may include any suitable communication interface for any of these networks, where appropriate.

It should be understood, of course, that the foregoing relates to exemplary embodiments of the invention and that modifications may be made without departing from the spirit and scope of the invention as set forth in the following claims.

What is claimed is:

1. A system for managing a multiple account database the system comprising:
   a control plane residing on a parent platform nonnative to the multiple account database, the control plane operatively associated with:
   a memory; and
   a processor coupled with the memory, wherein the memory stores instructions that, when executed by the processor, causes the control plane to perform operations comprising:
   providing a producer account on the parent platform
   integrating the producer account with a plurality of child accounts on the multiple account database so that data is shared between the producer account and each of the plurality of child accounts through application functionality native to the multiple account database;
   defining, at the parent platform level, configuration data for one or more account objects for the plurality of child accounts;
   publishing said configuration data to the producer account so that said configuration data is natively inherited or pushed on demand to the plurality of child accounts by way of the producer account; and
   granting ownership of each account object, associated with the configuration data, to a namespace role that only administrators of a respective child account have access thereto so that for each child account a user thereof must create each account object via a stored procedure that is native to the multiple account database.

2. The system of claim 1, wherein each account object comprises at least one of a tag, a parameter, a privilege, a resource, and a network policy.

3. The system of claim 2, wherein at the parent platform, by way of the processor, an immutability of each account object is enabled or disabled for each of the plurality of child accounts, whereby disabling immutability enables a user to augment the respective account object for each respective child account.

4. The system of claim 3, wherein the control plane is configured for setting privileges for each account object.

5. The system of claim 4, wherein the granting of ownership enables a high-level namespace construct facilitating access between a shared pool and a plurality of users, wherein the high-level namespace construct owns a one or more account objects in the shared pool of configurable resources so that each user manages the account objects only through a stored procedure obtaining a set of application programming interface calls for configuring each account object.

6. The system of claim 5, wherein each child account has one or more user, wherein each user is an individual or application.

7. The system of claim 5, wherein each resource comprises a role, a database, or a warehouse.

8. A method of configuring each account object for the multiple account database of claim 1, the method comprises:
   providing a user interface widget, by way of the processor, through the control plane, wherein the user interface widget enables changing each account object from default allow/deny to explicit allow to explicit deny and back.

9. The method of claim 8, wherein the user interface widget provides a clickable interface for changing each account object privilege.

10. The method of claim 9, wherein the configured account object is used by a stored procedure when users execute SQL commands indirectly via the stored procedure.

11. The system of claim 1, wherein the multiple account database is a platform.

12. The system of claim 1, wherein the multiple account database is a cloud-based platform.

* * * * *